(12) United States Patent
Sahoo et al.

(10) Patent No.: US 11,125,959 B2
(45) Date of Patent: Sep. 21, 2021

(54) FLAT DROP OPTICAL FIBER CABLE (71) Applicant: Sterlite Technologies Limited, Maharashtra (IN)

(72) Inventors: Kishore Sahoo, Maharashtra (IN); Kangbam Tenzing, Maharashtra (IN)

(73) Assignee: STERLiTE TECHNOLOGiES LiMiTED, Aurangabad (IN)

( * ) Notice: Subject to any disclaimer, the term of this patent is extended or adjusted under 35 U.S.C. 154(b) by 0 days.

(21) Appl. No.: 16/261,270

(22) Filed: Jan. 29, 2019

(65) Prior Publication Data
US 2020/0183118 A1    Jun. 11, 2020

(30) Foreign Application Priority Data

Dec. 6, 2018  (IN) .............................. 201821046209

(51) Int. Cl.
*G02B 6/44*    (2006.01)

(52) U.S. Cl.
CPC .......... *G02B 6/4403* (2013.01); *G02B 6/4494* (2013.01); *G02B 6/4498* (2013.01)

(58) Field of Classification Search
None
See application file for complete search history.

(56) References Cited

U.S. PATENT DOCUMENTS

| | | | | |
|---|---|---|---|---|
| 4,844,575 A * | 7/1989 | Kinard | ................. | G02B 6/4426 385/113 |
| 6,101,305 A * | 8/2000 | Wagman | ............. | G02B 6/4433 385/113 |
| 6,215,931 B1 * | 4/2001 | Risch | ................... | G02B 6/4429 385/109 |
| 7,391,944 B2 * | 6/2008 | Storaasli | ............. | G02B 6/4433 385/100 |
| 7,406,232 B2 * | 7/2008 | Stingl | ................. | G02B 6/4433 385/100 |
| 2003/0059182 A1 * | 3/2003 | Johnson | ............... | G02B 6/4403 385/112 |
| 2006/0165355 A1 * | 7/2006 | Greenwood | ......... | G02B 6/4433 385/100 |
| 2007/0025668 A1 * | 2/2007 | Greenwood | ......... | G02B 6/4404 385/103 |
| 2008/0013898 A1 * | 1/2008 | Wells | ................... | G02B 6/4475 385/96 |
| 2012/0288245 A1 * | 11/2012 | Hurley | ................. | G02B 6/4416 385/101 |
| 2013/0022325 A1 * | 1/2013 | Kachmar | ................. | G02B 6/44 385/114 |

(Continued)

*Primary Examiner* — Michael Stahl (57) ABSTRACT

The present disclosure provides a flat drop optical fiber cable. The flat drop optical fiber cable includes one or more buffer tubes. The one or more buffer tubes extend substantially along a longitudinal axis of the flat drop optical fiber cable. The flat drop optical fiber cable includes a plurality of optical fiber ribbons. The flat drop optical fiber cable includes one or more water blocking tapes. The one or more water blocking tapes are positioned in the flat drop optical fiber cable in one or more arrangements. The flat drop optical fiber cable includes a cable sheath. The cable sheath encapsulates the one or more buffer tubes and the one or more water blocking tapes. The flat drop optical fiber cable includes a plurality of strength members.

21 Claims, 2 Drawing Sheets

(56) References Cited

U.S. PATENT DOCUMENTS

| | | | |
|---|---|---|---|
| 2015/0234139 A1* | 8/2015 | Cignarale | G02B 6/4403 |
| | | | 385/114 |
| 2017/0343751 A1* | 11/2017 | Bookbinder | G02B 6/4403 |
| 2019/0113703 A1* | 4/2019 | Cook | G02B 6/4433 |
| 2020/0285010 A1* | 9/2020 | Abernathy | G01L 1/242 |

* cited by examiner

FLAT DROP OPTICAL FIBER CABLE

BACKGROUND

Field of the Invention

The present disclosure relates to the field of optical fiber cable, in particular, the present disclosure relates to a flat drop optical fiber cable for aerial application.

Description of the Related Art

Over the last few years, there has been a rapid growth in the use of optical fiber cables. One such type of optical fiber cables are drop optical fiber cables. The drop optical fiber cables run from a distribution point or cable to a subscriber/user. The drop optical fiber cables are primarily circular in shape or flat in shape. Traditionally, the circular drop optical fiber cables include multiple buffer tubes. Each buffer tube encapsulates multiple optical fibers. The drop optical fiber cables require tools to strip-open the buffer tube to access the optical fibers. The circular drop optical fiber cables are not suitable for aerial application due to inequivalent stresses of wind pressure. The drop optical fiber cables with loose optical fibers in flat structure increases width of the drop optical fiber cables drastically. The flat and circular drop optical fiber cables results in lower span length. The flat and circular drop optical fiber cables with multiple optical fibers result in longer installation time. The flat and circular drop optical fiber cables have higher cable weight.

In light of the foregoing discussion, there exists a need for a flat drop optical fiber cable which overcomes the above cited drawbacks of conventionally known drop optical fiber cables.

BRIEF SUMMARY OF THE INVENTION

In an aspect, the present disclosure provides a flat drop optical fiber cable for aerial application. The flat drop optical fiber cable includes one or more buffer tubes. The one or more buffer tubes extend substantially along a longitudinal axis passing through a geometrical center of the flat drop optical fiber cable. Each of the one or more buffer tubes is positioned to intersect a first straight line. The flat drop optical fiber cable includes a plurality of optical fiber ribbons. Each of the plurality of optical fiber ribbons includes a plurality of optical fibers. The one or more buffer tubes encapsulate the plurality of optical fiber ribbons. The flat drop optical fiber cable includes one or more water blocking tapes. The one or more water blocking tapes are positioned in the flat drop optical fiber cable in one or more arrangements. The one or more arrangements include a first arrangement and a second arrangement. The first arrangement includes a water blocking tape of the one or more water blocking tapes encapsulates a buffer tube of the one or more buffer tubes. The second arrangement includes a buffer tube of the one or more buffer tubes encapsulate a water blocking tape of the one or more water blocking tapes. The flat drop optical fiber cable includes a cable sheath. The cable sheath encapsulates the one or more buffer tubes and the one or more water blocking tapes. The cable sheath is characterized by a substantially elliptical shape. A major axis of the substantially elliptical cross sectional area of the cable sheath is parallel to the first straight line. The flat drop optical fiber cable includes a plurality of strength members. The plurality of strength members is embedded in the cable sheath. Each of the plurality of strength members is positioned to intersect the first straight line. The plurality of optical fibers in the flat drop optical fiber cable is 144.

In an aspect, the present disclosure provides a flat drop optical fiber cable for aerial application. The flat drop optical fiber cable includes one or more buffer tubes. The one or more buffer tubes extend substantially along a longitudinal axis passing through a geometrical center of the flat drop optical fiber cable. The flat drop optical fiber cable includes a plurality of optical fiber ribbons. Each of the plurality of optical fiber ribbons includes a plurality of optical fibers. The one or more buffer tubes encapsulate the plurality of optical fiber ribbons. The flat drop optical fiber cable includes one or more water blocking tapes. The one or more water blocking tapes are positioned in the flat drop optical fiber cable in one or more arrangements. The flat drop optical fiber cable includes a cable sheath. The cable sheath encapsulates the one or more buffer tubes and the one or more water blocking tapes.

In another aspect, the present disclosure provides a flat drop optical fiber cable for aerial application. The flat drop optical fiber cable includes one or more buffer tubes. The one or more buffer tubes extend substantially along a longitudinal axis passing through a geometrical center of the flat drop optical fiber cable. Each of the one or more buffer tubes is positioned to intersect a first straight line. The flat drop optical fiber cable includes a plurality of optical fiber ribbons. Each of the plurality of optical fiber ribbons includes a plurality of optical fibers. The one or more buffer tubes encapsulate the plurality of optical fiber ribbons. The flat drop optical fiber cable includes one or more water blocking tapes. The one or more water blocking tapes are positioned in the flat drop optical fiber cable in one or more arrangements. The one or more arrangements include a first arrangement and a second arrangement. The flat drop optical fiber cable includes a cable sheath. The cable sheath encapsulates the one or more buffer tubes and the one or more water blocking tapes. The cable sheath is characterized by a substantially elliptical shape. The plurality of optical fibers in the flat drop optical fiber cable is 144.

In yet another aspect, the present disclosure provides a flat drop optical fiber cable for aerial application. The flat drop optical fiber cable includes one or more buffer tubes. The one or more buffer tubes extend substantially along a longitudinal axis passing through a geometrical center of the flat drop optical fiber cable. Each of the one or more buffer tubes is positioned to intersect a first straight line. The flat drop optical fiber cable includes a plurality of optical fiber ribbons. Each of the plurality of optical fiber ribbons includes a plurality of optical fibers. The one or more buffer tubes encapsulate the plurality of optical fiber ribbons. The flat drop optical fiber cable includes one or more water blocking tapes. The one or more water blocking tapes are positioned in the flat drop optical fiber cable in one or more arrangements. The one or more arrangements include a first arrangement and a second arrangement. The first arrangement includes a water blocking tape of the one or more water blocking tapes encapsulates a buffer tube of the one or more buffer tubes. The second arrangement includes a buffer tube of the one or more buffer tubes encapsulate a water blocking tape of the one or more water blocking tapes. The flat drop optical fiber cable includes a cable sheath. The cable sheath encapsulates the one or more buffer tubes and the one or more water blocking tapes. The cable sheath is characterized by a substantially elliptical shape. A major axis of the substantially elliptical cross sectional area of the cable sheath is parallel to the first straight line. The flat drop optical fiber cable includes a plurality of strength members.

The plurality of strength members is embedded in the cable sheath. Each of the plurality of strength members is positioned to intersect the first straight line. The plurality of optical fibers in the flat drop optical fiber cable is 144.

A primary object of the disclosure is to provide a flat drop optical fiber cable.

Another object of the present disclosure is to provide the flat drop optical fiber cable ideal for aerial application.

Yet another object of the present disclosure is to provide the flat drop optical fiber cable with reduced cable weight.

Yet another object of the present disclosure is to provide the flat drop optical fiber cable with easily strippable buffer tubes.

Yet another object of the present disclosure is to provide the flat drop optical fiber cable with higher span length to enable a reduction in number of support towers.

In an embodiment of the present disclosure, the one or more buffer tubes are formed of either low smoke zero halogen or thermoplastic elastomer. Each of the one or more buffer tubes is easily strippable. Each of the one or more buffer tubes is finger peelable.

In an embodiment of the present disclosure, the cable width of the flat drop optical fiber cable is about 8.8 millimeters. The cable height of the flat drop optical fiber cable is about 13.1 millimeter. The cable weight of the flat drop optical fiber cable is about 110 kilogram per kilometer.

In an embodiment of the present disclosure, the cable sheath is formed of either polyethylene or low smoke zero halogen.

In an embodiment of the present disclosure, each of the plurality of optical fiber ribbons is characterized by a ribbon width and a ribbon height. The ribbon width is about 3.2 millimeters. The ribbon height is about 0.32 millimeters.

In an embodiment of the present disclosure, each of the one or more buffer tubes is characterized by a first thickness, an inner diameter and an outer diameter. The first thickness of each of the one or more buffer tubes is 0.2 millimeter±0.05 millimeter. The inner diameter of each of the one or more buffer tubes is 5.30 millimeters±0.1 millimeter. The outer diameter of each of the one or more buffer tubes is 5.70 millimeters±0.1 millimeter.

In an embodiment of the present disclosure, the plurality of optical fiber ribbons in the flat drop optical fiber cable is 12. Each of the plurality of optical fiber ribbons includes 12 optical fibers.

In an embodiment of the present disclosure, the substantially elliptical cross sectional area of the cable sheath comprising a first flat side and a second flat side. The first flat side and the second flat side are parallel the first straight line. The first straight line extends orthogonally to the longitudinal axis.

In an embodiment of the present disclosure, the flat drop optical fiber cable includes a plurality of ripcords. The plurality of ripcords is embedded in the cable sheath.

In an embodiment of the present disclosure, the plurality of strength members are positioned at a first end of the first straight line and at a second end of the first straight line, wherein each of the plurality of strength members is characterized by a first diameter, wherein the first diameter of each of the plurality of strength members is 2.2 millimeters±0.05 millimeters.

DESCRIPTION OF THE DRAWINGS

Having thus described the disclosure in general terms, reference will now be made to the accompanying figures, wherein:

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Flat drop optical fiber cable.
102. Geometrical center.
104. Longitudinal axis.
106. Buffer tubes.
108. Optical fiber ribbons.
110. Water blocking tapes.
112. Cable sheath.
114. Strength members.
116. Ripcords.
118. The first straight line.
120. The first flat side.
122. The second flat side.
124. The first arc.
126. The second arc joins.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

In this description we will explain and provide more details about the flat drop optical fiber cable that is comprising one or more buffer tubes, wherein the one or more buffer tubes extends substantially along a longitudinal axis passing through a geometrical center of the flat drop optical fiber cable, and a plurality of optical fiber ribbons, wherein each of the plurality of optical fiber ribbons comprising a plurality of optical fibers, wherein the one or more buffer tubes encapsulates the plurality of optical fiber ribbons.

Figure 1:
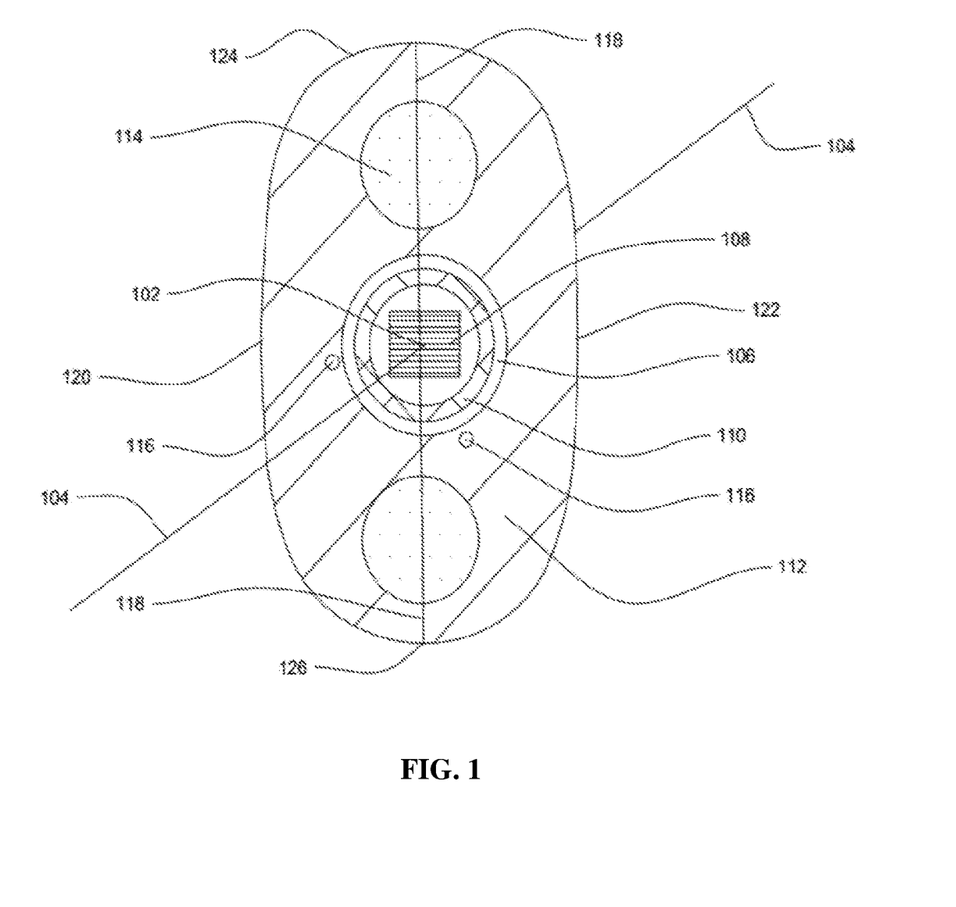
FIG. 1 illustrates a cross sectional view of a flat drop optical fiber cable, in accordance with an embodiment of the present disclosure.
Figure 2:
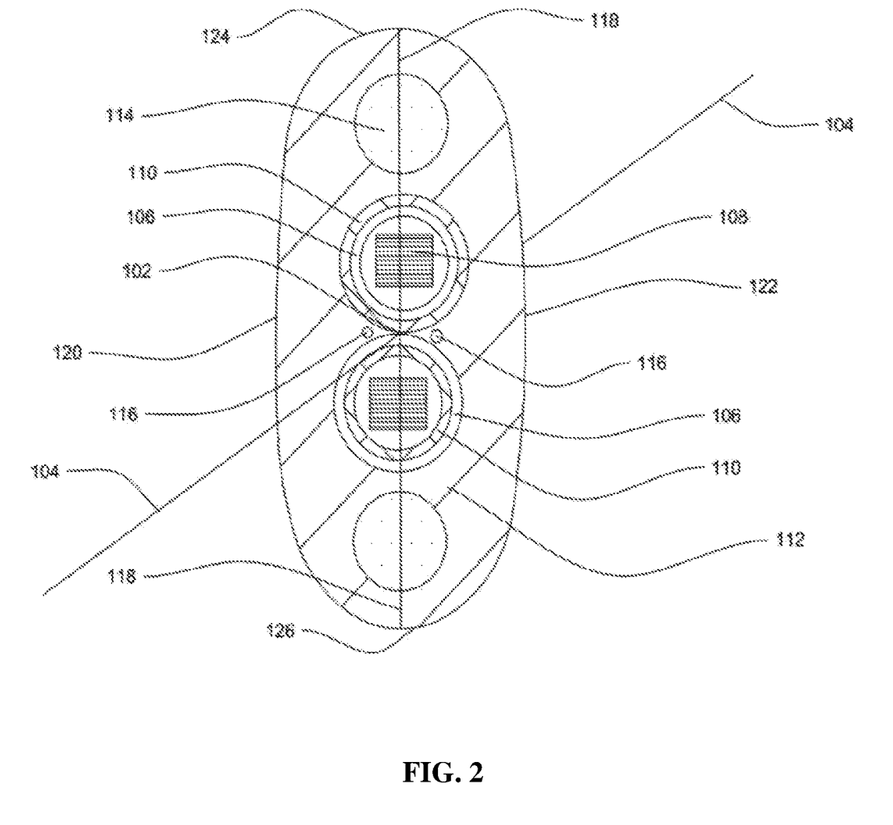
FIG. 2 illustrates a cross sectional view of the flat drop optical fiber cable of FIG. 1, in accordance with another embodiment of the present disclosure.

FIG. 1 illustrates a cross sectional view of a flat drop optical fiber cable 100, in accordance with an embodiment of the present disclosure. FIG. 2 illustrates a cross sectional view of the flat drop optical fiber cable 100, in accordance with another embodiment of the present disclosure. In general, an optical fiber cable is a network cable that contains strands or array of glass fibers inside an insulated casing. The glass fibers are optical transmission elements and, are used to carry optical signals. The insulated casing facilitates to protect the optical transmissions elements from heat, cold, harsh environment, unwanted disturbances and external interference from other types of wiring. The insulated casing provides protection to the flat drop optical fiber cable 100 from ultraviolet rays of sun. The flat drop optical fiber cable 100 is designed for aerial application. In general, drop optical fiber cables are specifically designed for fiber-to-the-subscriber applications. In general, drop optical fiber cables are dielectric cables ideally suited for self-supporting drop-type installations and in lashed or conduit builds.

The flat drop optical fiber cable 100 is a flat optical cable. In general, flat optical cables are non-circular with two flat or substantially parallel sides. The flat drop optical fiber cable 100 is characterized by elliptical cross sectional area with two flat sides. The flat drop optical fiber cable 100 is designed to enable higher span length. The flat drop optical fiber cable 100 includes easy strippable buffer tubes. The flat drop optical fiber cable 100 is designed for long distance transmission of optical signals. The flat drop optical fiber cable 100 enables high speed data transmission. The flat drop optical fiber cable 100 transmits data at a higher speed than copper data cable. The flat drop optical fiber cable 100 transmits data at much higher band width than copper data cable. The flat drop optical fiber cable 100 is optimized in weight. In general, light weight optical cables are employed for aerial, duct and underground installations. The flat drop optical fiber cable 100 is used for aerial application. The flat drop optical fiber cable 100 is used for a wide variety of applications. The flat drop optical fiber cable 100 is less susceptible to interference.

The flat drop optical fiber cable 100 includes one or more buffer tubes 106, a plurality of optical fiber ribbons 108 and one or more water blocking tapes 110. In addition, the flat drop optical fiber cable 100 includes a cable sheath 112, a plurality of strength members 114 and a plurality of ripcords 116. The above combination of structural elements enables an improvement in a plurality of characteristics of the flat drop optical fiber cable 100. The plurality of characteristics includes but may not be limited to optical characteristics, mechanical characteristics, electrical characteristics, transmission characteristics and the like.

The flat drop optical fiber cable 100 includes the one or more buffer tubes 106. In general, buffer tubes meet an optimal requirement of dimensions to facilitate free arrangement of the light transmission elements. The one or more buffer tubes 106 extends substantially along a longitudinal axis 104. The longitudinal axis 104 passes through a geometrical center 102 of the flat drop optical fiber cable 100. In general, geometrical center corresponds to a point at center of cross sectional geometry of a body. In general, longitudinal axis corresponds to an imaginary axis passing through geometrical center of a body. The geometrical center 102 is center of cross sectional geometry of the flat drop optical fiber cable 100. The longitudinal axis 104 is an imaginary axis. The one or more buffer tubes 106 extend along entire length of the flat drop optical fiber cable 100.

Each of the one or more buffer tubes 106 is positioned to intersect a first straight line 118. The first straight line 118 is an imaginary line. The first straight line 118 extends orthogonally to the longitudinal axis 104 of the flat drop optical fiber cable 100. In an embodiment of the present disclosure, the flat drop optical fiber cable 100 includes two buffer tubes. The two buffer tubes are positioned substantially along the first straight line 118. Each of the one or more buffer tubes 106 provides primary protection to optical fibres of the flat drop optical fiber cable 100. The one or more buffer tubes 106 maintain adequate flexibility over a wide range of temperatures. The one or more buffer tubes 106 have low moisture sensitivity, good heat resistance, dimensional stability and chemical resistance. The one or more buffer tubes 106 forms inner barrier against water penetration and facilitates to isolate the optical fibers from thermal stresses.

Each of the one or more buffer tubes 106 is a substantially cylindrical tube for encapsulating plurality of optical transmission elements. Each of the one or more buffer tubes 106 is easily strippable. In general, buffer tube of an optical cable is stripped or peeled-off to enable access to optical fibers. The one or more buffer tubes 106 are striped to enable access to the optical fibers of the flat drop optical fiber cable 100. Each of the one or more buffer tubes 106 is finger peelable. Each of the one or more buffer tubes 106 is easily peeled-off with human fingers. Each of the one or more buffer tubes 106 is easily peeled-off with human fingers to enable access to the optical fibers of the flat drop optical fiber cable 100.

Each of the one or more buffer tubes 106 is circular in cross section. Each of the one or more buffer tubes 106 is uniform in structure and dimensions. Each of the one or more buffer tubes 106 is characterized by a first diameter and a second diameter. The first diameter is an inner diameter of the one or more buffer tubes 106. The second diameter is an outer diameter of the one or more buffer tubes 106. The inner diameter is diameter of internal surface of each of the one or more buffer tubes 106. The inner diameter of each of the one or more buffer tubes 106 is in a range of about 5.30 millimeters±0.1 millimeter. In an embodiment of the present disclosure, each of the one or more buffer tubes has any suitable value of inner diameter. The outer diameter is diameter of external surface of each of the one or more buffer tubes 106. The outer diameter of each of the one or more buffer tubes 106 is in a range of about 5.70 millimeters±0.1 millimeter. In an embodiment of the present disclosure, each of the one or more buffer tubes has any suitable value of outer diameter. In an embodiment of the present disclosure, the cross section of each of the one or more buffer tubes 106 is of any suitable cross section.

Further, each of the one or more buffer tubes 106 is characterized by a first thickness. The first thickness is radial thickness of each of the one or more buffer tubes 106 between an inner surface and outer surface of the one or more buffer tubes 106. The first thickness of each of the one or more buffer tubes 106 is identical. The first thickness of each of the one or more buffer tubes 106 is in a range of about 0.2 millimeters±0.05 millimeters. In an embodiment of the present disclosure, each of the one or more buffer tubes 106 has any suitable first thickness. Each of the one or more buffer tubes 106 are formed of either low smoke zero halogen or thermoplastic elastomer. In general, low smoke zero halogen and thermoplastic elastomer enable easy stripping or peeling of buffer tube. In an embodiment of the present disclosure, each of the one or more buffer tubes 106 are formed of low smoke zero halogen. In another embodiment of the present disclosure, each of the one or more buffer tubes 106 is formed of thermoplastic elastomer. In yet another embodiment of the present disclosure, each of the one or more buffer tubes 106 is formed of any suitable material which is easily strippable. In yet another embodiment of the present disclosure, each of the one or more buffer tubes 106 is formed of any suitable material of the like.

The flat drop optical fiber cable 100 includes the plurality of optical fiber ribbons 108. The one or more buffer tubes 106 encapsulate the plurality of optical fiber ribbons 108. In general, multiple optical fibers are sandwiched, encapsulated, and/or edge bonded to form an optical fiber ribbon. In general, optical fiber ribbon cables have inherent advantage of mass fusion splicing. Mass fusion splicing makes installation of optical fiber cable easy and saves time. The plurality of optical fiber ribbons 108 enable high packing density and higher counts to enables more efficient use of space. The plurality of optical fiber ribbons 108 are prepped and spliced easily. The plurality of optical fiber ribbons 108 enable less installation time, less installation labor cost and significantly less emergency restoration time. The plurality of optical fiber ribbons 108 are rollable ribbons. In an embodiment of the present disclosure, the plurality of optical fiber ribbons 108 is non-rollable ribbons.

Each of the plurality of optical fiber ribbons 108 includes a plurality of optical fibers. In general, an optical fiber is a light transmission element used for transmitting information as light pulses from one end to another. In addition, each of the plurality of optical fibers is a thin strand of glass suitable for transmitting optical signals. Also, each of the plurality of optical fibers is configured to transmit large amounts of information over long distances with relatively low attenuation. The plurality of optical fibers enables optic fiber communication. In general, optical fiber communication is a method of transmitting information from one place to another by sending pulses of light through optical fiber. The light forms an electromagnetic carrier wave that is modulated to carry information. Each of the plurality of optical fibers is a single mode optical fiber. In an embodiment of the present disclosure, each of the plurality of optical fibers is a multimode optical fiber.

Each of the plurality of optical fibers in the flat drop optical fiber cable 100 includes a core region and a cladding region. The core region is an inner part of an optical fiber and the cladding section is an outer part of the optical fiber. Moreover, the core region is defined by a central longitudinal axis of each of the at least one optical fiber. In addition, the cladding region surrounds the core region. Each of the plurality of optical fibers in the flat drop optical fiber cable 100 is colored optical fiber. Each of the plurality of optical fibers is characterized by a diameter. The diameter is outer diameter of cladding of each of the plurality of optical fibers. The diameter of each of the plurality of optical fibers is about 0.25 millimeters. In an embodiment of the present disclosure, each of the plurality of optical fibers has any suitable diameter of the like.

The plurality of optical fiber ribbons 108 in the flat drop optical fiber cable 100 is 12. In an embodiment of the present disclosure, the flat drop optical fiber cable 100 includes any suitable number of plurality of optical fiber ribbons 108. Each of the plurality of optical fiber ribbons 108 includes 12 optical fibers. The flat drop optical fiber cable 100 includes 144 (12×12) optical fibers. In an embodiment of the present disclosure, the flat drop optical fiber cable 100 includes any suitable number of plurality of optical fibers. Each of the plurality of optical fiber ribbons 108 is characterized by a ribbon width and a ribbon diameter. In general, ribbon width corresponds to maximum end-to-end distance between two extremes optical fibers in a ribbon. The ribbon height corresponds to dimension of side orthogonal to the ribbon width. The ribbon width of each of the plurality of optical fiber ribbons 108 is about 3.2 millimeters. The ribbon height of each of the plurality of optical fiber ribbons 108 is about 0.32 millimeters. In an embodiment of the present disclosure, the optical fiber ribbons 108 have any suitable value of ribbon width and ribbon height.

The flat drop optical fiber cable 100 includes the one or more water blocking tapes 110. In general, water blocking tape is formed of water resistant material and prevents ingression of water and moisture. The one or more water blocking tapes 110 are characterized by substantially cylindrical shape. The one or more water blocking tapes 110 are positioned in the flat drop optical fiber cable 100 in one or more arrangements. The one or more arrangements include a first arrangement and a second arrangement. The first arrangement includes a buffer tube of the one or more buffer tubes 106 encapsulated by a water blocking tape of the one or more water blocking tapes 110. The water blocking tape of the one or more water blocking tapes 110 circumferentially surrounds the buffer tube of the one or more buffer tubes 106. The water blocking tape surrounds the buffer tube along entire length of the flat drop optical fiber cable 100 (as shown in FIG. 2). In an embodiment of the present disclosure, each of the one or more water blocking tapes 110 encapsulates each of the one or more buffer tubes 106.

The second arrangement includes a water blocking tape of the one or more water blocking tapes 110 encapsulated by a buffer tube of the one or more buffer tubes 106. The buffer tube of the one or more buffer tubes 106 circumferentially surrounds the water blocking tape of the one or more water blocking tapes 110. The buffer tube surrounds the water blocking tape along entire length of the flat drop optical fiber cable 100. In an embodiment of the present disclosure, the one or more water blocking tapes 110 are positioned in the flat drop optical fiber cable 100 in any suitable manner. In an embodiment of the present disclosure, the flat drop optical fiber cable 100 includes a plurality of one or more arrangements. The one or more water blocking tapes 110 is characterized by a second thickness. The second thickness corresponds to thickness of the one or more water blocking tapes 110 inside the one or more buffer tubes 106. The second thickness of the one or more water blocking tapes 110 is about 0.3 millimeter. The one or more water blocking tapes 110 is characterized by a first width and a second width. The first width is width of the one or more water blocking tapes 110 positioned inside the one or more buffer tubes 106. The first width of the one or more water blocking tapes 110 is in a range of about 23 millimeters±1 millimeter. The second width is width of the one or more water blocking tapes 110 positioned around the one or more buffer tubes 106. The second width of the one or more water blocking tapes 110 is in a range of about 22 millimeters±1 millimeter.

The flat drop optical fiber cable 100 includes the cable sheath 112. The cable sheath 112 encapsulates the one or more buffer tubes 106 and the one or more water blocking tapes 110. In general, cable sheath is outermost layer of an optical cable and protects the optical cable from external hazards. The cable sheath 112 protects the flat drop optical fiber cable 100 from moisture, dust, dirt, harmful environment and UV rays. The cable sheath 112 extends substantially along entire length of the flat drop optical fiber cable 100. The cable sheath 112 is a covering jacket of the flat drop optical fiber cable 100. The cable sheath 112 protects core of optical fiber cables 100 from harsh environment, water, moisture, dust, external radiations, mechanical forces and harmful UV rays. The cable sheath 112 is black in color. In an embodiment of the present disclosure, the cable sheath 112 is of any suitable color of the like.

The cable sheath 112 is characterized by a substantially elliptical cross sectional area. The substantially elliptical cross sectional area of the cable sheath 112 is associated with a major axis and a minor axis. In general, major axis corresponds to a line segment passing through center and connecting the widest points on perimeter of ellipse. In general, minor axis corresponds to a line segment passing through center and connecting the nearest points on perimeter of ellipse. The major axis of the substantially elliptical cross section is parallel to the first straight line 118. The substantially elliptical cross sectional area of the cable sheath 112 includes a first flat side 120 and a second flat side 122. The substantially elliptical cross sectional area of the cable sheath 112 includes a first arc 124 and a second arc 126. The first arc 124 extends from one end of the first flat side 120 to corresponding one end of the second flat side 122. The second arc joins 126 extends from other end of the first flat side 120 to corresponding other end of the second flat side 122. The first flat side 120 is parallel to the second flat side 122. The first flat side 120 and the second flat side 122 of the cable sheath 112 are parallel to the first straight line 118. The first flat side 120 and the second flat side 122 of the cable sheath 112 are parallel to the major axis of the cable sheath 112. The first flat side 120 and the second flat side 122 extend substantially along entire length of the flat drop optical fiber cable 100.

The cable sheath 112 is characterized by a third thickness. The third thickness corresponds to minimum thickness of the cable sheath 112 over the one or more buffer tubes 106. The third thickness is shortest distance between the one or more buffer tubes 106 and the cable sheath 112. The third thickness of the cable sheath 112 is in a range of about 1.4 millimeters±0.1 millimeter. The cable sheath 112 is formed of either polyethylene or low smoke zero halogen. In general, polyethylene is usually a mixture of similar polymers of ethylene with various number of polyethylene molecules. Polyethylene is a rugged flexible and durable material. In general, low smoke zero halogen emits limited smoke, no halogen and won't produce dangerous gas when exposed to high sources of heat. In an embodiment of the present disclosure, the cable sheath 112 is formed of any suitable material of the like.

The flat drop optical fiber cable 100 includes a plurality of strength members 114. The plurality of strength members 114 are embedded in the cable sheath 112. In general, strength members provide tensile strength and mechanical support to optical fiber cable. The plurality of strength members 114 is positioned to intersect the first straight line 118. The first straight line 118 includes a first end and a second end. The first end and the second end are two extreme ends of the first straight line 118. The plurality of strength members 114 are positioned at the first end and the second end of the first straight line 118. In an embodiment of the present disclosure, the flat drop optical fiber cable 100 includes two strength members. The two strength members are positioned at the first end and at the second end of the flat drop optical fiber cable 100.

In an embodiment of the present disclosure, the plurality of strength members 114 is positioned at any suitable position of the like.

Each of the plurality of strength members 114 is circular in cross section. The center of the circular cross section of the plurality of strength members 114 lies substantially along the first straight line 118. In an embodiment of the present disclosure, the plurality of strength members 114 is of any other suitable cross section. The plurality of strength members 114 is characterized by a third diameter. The third diameter is diameter of circular cross section of each of the plurality of strength members 114. The third diameter of each of the plurality of strength members 114 is in a range of about 2.2 millimeters±0.05 millimeters. In an embodiment of the present disclosure, each of the plurality of strength members 114 has any suitable value of the first diameter.

The plurality of strength members 114 lies substantially along the longitudinal axis 104 of the flat drop optical fiber cable 100. The plurality of strength members 114 extends along entire length of the flat drop optical fiber cable 100. The plurality of strength members 114 bears forces applied on the flat drop optical fiber cable 100 during maintenance, installation and regular use. The plurality of strength members 114 prevents the flat drop optical fiber cable 100 from damage and increases life span of the flat drop optical fiber cable 100. The plurality of strength members 114 provides physical strength to the flat drop optical fiber cable 100 and resists over bending of the flat drop optical fiber cable 100. In addition, the plurality of strength members 114 provides tensile strength to the flat drop optical fiber cable 100. The plurality of strength members 114 provides structural resistance the flat drop optical fiber cable 100 against buckling.

Each of the plurality of strength members 114 is formed of either fiber reinforced plastic or aramid reinforced plastic. In an embodiment of the present disclosure, the plurality of strength members 114 is formed of any suitable material. The cable sheath 112 is characterized by a fourth thickness and a fifth thickness. The fourth thickness is thickness of the cable sheath 112 between the one or more buffer tubes 106 and a nearest strength member of the plurality of strength members 114. The fourth thickness of the cable sheath 112 is in a range of about 0.4 millimeter±0.1 millimeter. The fifth thickness is thickness of the cable sheath 112 over the plurality of strength members 114 in direction perpendicular to the first straight line 118. The fifth thickness of the cable sheath 112 is in a range of about 0.8 millimeter±0.1 millimeter. In an embodiment of the present disclosure, the cable sheath 112 has any suitable value of thickness.

The flat drop optical fiber cable 100 includes the plurality of ripcords 116. The plurality of ripcords 116 is embedded in the cable sheath 112. The plurality of ripcords 116 extends substantially along entire length of the flat drop optical fiber cable 100. In general, ripcords facilitate in striping of outer sheath of optical cables to enable access to optical fibers. The plurality of ripcords 116 facilitates striping of the cable sheath 112 of the flat drop optical fiber cable 100. The plurality of ripcords 116 facilitates striping of the cable sheath 112 to enable access to the plurality of optical fiber ribbons 108. The plurality of ripcords 116 is positioned around the one or more buffer tubes 106. In an embodiment of the present disclosure, the plurality of ripcords 116 is positioned at any suitable position of the like.

In an embodiment of the present disclosure, the plurality of ripcords 116 is formed of either polyester or aramids. In another embodiment of the present disclosure, the plurality of ripcords 116 is formed of any other suitable material. In an embodiment of the present disclosure, number of plurality of ripcords 116 in the flat drop optical fiber cable 100 is 2. In another embodiment of the present disclosure, number of plurality of ripcords 116 may vary. In an embodiment of the present disclosure, the plurality of ripcords 116 is of yellow color. In another embodiment of the present disclosure, the plurality of ripcords 116 is of any suitable color of the like.

The flat drop optical fiber cable 100 is characterized by a cable width. The cable width of the flat drop optical fiber cable 100 corresponds to shortest distance between the first flat side 120 and the second flat side 122. The cable width of the flat drop optical fiber cable 100 is measured along a straight line orthogonal to the first flat side 120 or the second flat side 122. In an embodiment of the present disclosure, the cable width of the flat drop optical fiber cable 100 is about 8.8 millimeters. In another embodiment of the present disclosure, the flat drop optical fiber cable 100 has any suitable value of the cable width. The flat drop optical fiber cable 100 is characterized by a cable height. The cable height of the flat drop optical fiber cable 100 corresponds to maximum distance between the first arc 124 and the second arc 126. The cable height of the flat drop optical fiber cable 100 is measured along a straight line parallel to the first flat side 120. In an embodiment of the present disclosure, the cable height of the flat drop optical fiber cable 100 is about 13.1 millimeters. In another embodiment of the present disclosure, the flat drop optical fiber cable 100 has any suitable value of cable height. The flat drop optical fiber cable 100 is characterized by a cable weight. The cable weight corresponds to weight of the flat drop optical fiber cable 100. In an embodiment of the present disclosure, the cable weight of the flat drop optical fiber cable 100 is about 110 kilograms per kilometer. In an embodiment of the present disclosure, the flat drop optical fiber cable 100 has any suitable value of the cable weight.

The flat drop optical fiber cable 100 is UV resistant. The cable sheath 112 of the flat drop optical fiber cable 100 is formed of UV resistant material. The flat drop optical fiber cable 100 is resistant to harmful UV rays of sun. The flat drop optical fiber cable 100 is ideal for aerial application. The flat drop optical fiber cable 100 includes the plurality of strength members 114 embedded in the cable sheath 112. The plurality of strength members 114 of the flat drop optical fiber cable 100 enable anti-buckling properties. The flat drop optical fiber cable 100 is resistant to buckling. The one or more buffer tubes 106 of the flat drop optical fiber cable 100 are easily strippable. The flat drop optical fiber cable 100 enable easy access to the plurality of optical fiber ribbons 108. The flat drop optical fiber cable 100 is light in weight.

The flat drop optical fiber cable 100 is characterized by easy fiber access. The flat drop optical fiber cable 100 enable easy access to the plurality of optical fibers due to finger peelable buffer tubes. The flat drop optical fiber cable 100 enable easy access to the plurality of optical fibers due to the cable sheath 112. The flat drop optical fiber cable 100 is low in cost. The flat drop optical fiber cable 100 is less prone to wind pressure loads. The flat drop optical fiber cable 100 is gel free and dry optical cable. The flat drop optical fiber cable 100 is characterized by a reduced installation time. The reduced installation time of the flat drop optical fiber cable 100 is due to gel free and dry construction. The reduced installation time of the flat drop optical fiber cable 100 is due to the plurality of optical fiber ribbons 108. The plurality of optical fiber ribbons 108 allow mass fusion splicing to enable the reduced installation time. The flat drop optical fiber cable enable higher span length for aerial application.

The flat drop optical fiber cable has numerous advantages over the prior art. The flat drop optical fiber cable is ideal for aerial application. In addition, the flat drop optical fiber cable has optimized design and dimensions. Moreover, the flat drop optical fiber cable has a reduced weight. The reduced weight of the cable enables the easier aerial application of the flat drop optical fiber cable. Furthermore, the flat drop optical fiber cable is a cable with a single layer construction. The single layer construction enables a decrease in manufacturing time for the flat drop optical fiber cable. Also, the single layer construction allows easier access to optical fibers of the flat drop optical fiber cable during mid-spanning.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

The above specification provides examples of how certain inventive aspects may be put into practice. It will be appreciated that the inventive aspects can be practiced in other ways than those specifically shown and described herein without departing from the spirit and scope of the inventive aspects of the present disclosure.

What is claimed is:
1. A flat drop optical fiber cable, comprising:
one or more buffer tubes, wherein the one or more buffer tubes extends substantially along a longitudinal axis passing through a geometrical center of the flat drop optical fiber cable;

a plurality of optical fiber ribbons, wherein each of the plurality of optical fiber ribbons comprising a plurality of optical fibers, wherein the one or more buffer tubes encapsulates the plurality of optical fiber ribbons; and a cable sheath encapsulating the one or more buffer tubes and the plurality of optical fiber ribbons, wherein the cable sheath is characterized by an elliptical cross section, wherein each of the one or more buffer tubes is circular in cross section, encapsulated in the elliptical cross section of the cable sheath, and wherein each of the one or more buffer tubes is strippable or finger peelable.

2. The flat drop optical fiber cable as claimed in claim 1, wherein the flat drop optical fiber cable is characterized by reduced weight of 110 kilograms per kilometer.

3. The flat drop optical fiber cable as claimed in claim 1, wherein the plurality of optical fiber ribbons is one of rollable ribbons and non-rollable ribbons.

4. The flat drop optical fiber cable as claimed in claim 1, wherein the plurality of optical fibers in the flat drop optical fiber cable is 144.

5. A flat drop optical fiber cable comprising:
one or more buffer tubes, wherein the one or more buffer tubes extends substantially along a longitudinal axis passing through a geometrical center of the flat drop optical fiber cable, wherein each of the one or more buffer tubes is positioned to intersect a first straight line extending orthogonally to the longitudinal axis of the flat drop optical fiber cable, wherein the one or more buffer tubes extend along entire length of the flat drop optical fiber cable, and wherein the one or more buffer tubes are formed of one of low smoke zero halogen or thermoplastic elastomer; and a plurality of optical fiber ribbons, wherein each of the plurality of optical fiber ribbons comprising a plurality of optical fibers, wherein the one or more buffer tubes encapsulates the plurality of optical fiber ribbons, wherein the plurality of optical fibers in the flat drop optical fiber cable is 144, wherein the flat drop optical fiber cable is characterized by reduced weight of 110 kilograms per kilometer.

6. The flat drop optical fiber cable as claimed in claim 5, wherein the reduced weight of the flat drop optical fiber cable enables increase in span length further comprising a cable sheath, wherein the cable sheath encapsulates the one or more buffer tubes, wherein the cable sheath is formed of one of polyethylene and low smoke zero halogen, wherein the cable sheath is characterized by a substantially elliptical shape at cross section of the cable sheath, wherein a thickness of the cable sheath is in a range of 1.4 millimeters to±0.1 millimeters.

7. The flat drop optical fiber cable as claimed in claim 5, further comprising a plurality of strength members, wherein the plurality of strength members is embedded in a cable sheath, wherein at least one of a diameter of each of the plurality of strength members is in a range of 2.2 millimeters to±0.05 millimeters, and wherein a thickness of the cable sheath is in one of a range of 0.4 to millimeter to±0.1 millimeter and a range of 0.8 millimeter to±0.1 millimeter.

8. The flat drop optical fiber cable as claimed in claim 6, wherein the fiber access enables access to each of the plurality of optical fibers due to the cable sheath.

9. The flat drop optical fiber cable as claimed in claim 5, wherein the plurality of optical fiber ribbons is one of rollable ribbons and non-rollable ribbons.

10. A flat drop optical fiber cable comprising:
one or more buffer tubes, wherein the one or more buffer tubes extends substantially along a longitudinal axis passing through a geometrical center of the flat drop optical fiber cable, wherein each of the one or more buffer tubes is positioned to intersect a first straight line extending orthogonally to the longitudinal axis of the flat drop optical fiber cable, wherein the one or more buffer tubes extend along entire length of the flat drop optical fiber cable, and wherein the one or more buffer tubes are formed of one of low smoke zero halogen or thermoplastic elastomer;

a plurality of optical fiber ribbons, wherein each of the plurality of optical fiber ribbons comprising a plurality of optical fibers, wherein the one or more buffer tubes encapsulates the plurality of optical fiber ribbons, wherein the plurality of optical fibers in the flat drop optical fiber cable is 144, wherein the flat drop optical fiber cable is characterized by reduced weight of 110 kilograms per kilometer, wherein the reduced weight of the flat drop optical fiber cable enables increased span length, wherein reduced weight of 110 kilograms per kilometer of the flat drop optical fiber cable enables aerial application, wherein the fiber access enables access to each of the plurality of optical fibers; and a cable sheath encapsulating the one or more buffer tubes and the plurality of optical fiber ribbons and one or more water blocking tapes, wherein the cable sheath is characterized by an elliptical cross section.

11. The flat drop optical fiber cable as claimed in claim 10, wherein the cable sheath is formed of one of polyethylene and low smoke zero halogen, wherein a thickness of the cable sheath is in a range of 1.4 millimeters to±0.1 millimeters.

12. The flat drop optical fiber cable as claimed in claim 10, wherein the one or more water blocking tapes are positioned in the flat drop optical fiber cable in first arrangement or a second arrangement, wherein the first arrangement includes a buffer tube of the one or more buffer tubes encapsulated by a water blocking tape of the one or more water blocking tapes, wherein the water blocking tape circumferentially surrounds the buffer tube of the one or more buffer tubes along length of the flat drop optical fiber cable, wherein the second arrangement includes a water blocking tape of the one or more water blocking tapes encapsulated by a buffer tube of the one or more buffer tubes, and wherein buffer tube of the one or more buffer tubes circumferentially surrounds the water blocking tape of the one or more water blocking tapes along a length of the flat drop optical fiber cable.

13. The flat drop optical fiber cable as claimed in claim 10, further comprising a plurality of strength members, wherein the plurality of strength members is embedded in the cable sheath, and wherein at least one of a diameter of each of the plurality of strength members is in a range of 2.2 millimeters to±0.05 millimeters, and wherein a thickness of the cable sheath is in one of a range of 0.4 to millimeter to±0.1 millimeter and a range of 0.8 millimeter to±0.1 millimeter.

14. The flat drop optical fiber cable as claimed in claim 10, wherein the one or more buffer tubes are formed of either low smoke zero halogen or thermoplastic elastomer, wherein each of the one or more buffer tubes is strippable, wherein each of the one or more buffer tubes is finger peelable.

15. The flat drop optical fiber cable as claimed in claim 10, wherein the flat drop optical fiber cable has a cable width of 8.8 millimeters, a cable height of 13.1 millimeters and a cable weight of 110 kilograms per kilometer.

16. The flat drop optical fiber cable as claimed in claim 10, wherein each of the plurality of optical fiber ribbons is characterized by a ribbon width and a ribbon height, wherein the ribbon width is 3.2 millimeters, wherein the ribbon height is 0.32 millimeters.

17. The flat drop optical fiber cable as claimed in claim 10, wherein each of the one or more buffer tubes is characterized by a first thickness, a first diameter and a second diameter, wherein the first thickness of each of the one or more buffer tubes is in a range of 0.2 millimeter±0.05 millimeter, wherein the first diameter of each of the one or more buffer tubes is in a range of 5.30 millimeters±0.1 millimeter, wherein the second diameter of each of the one or more buffer tubes is in a range of 5.70 millimeters±0.1 millimeters, wherein the first thickness is a radial thickness of each of the one or more buffer tubes between the first diameter and the second diameter of the one or more buffer tubes, wherein the first thickness of each of the one or more buffer tubes is identical, and wherein the first thickness of each of the one or more buffer tubes is in a range of 0.2 millimeters to±0.05 millimeters.

18. The flat drop optical fiber cable as claimed in claim 10, further comprising a plurality of ripcords, wherein the plurality of ripcords is embedded in the cable sheath.

19. The flat drop optical fiber cable as claimed in claim 5, wherein the plurality of optical fiber ribbons in the flat drop optical fiber cable is 12, wherein each of the plurality of optical fiber ribbons comprising 12 optical fibers.

20. The flat drop optical fiber cable as claimed in claim 1, wherein each of the one or more buffer tubes is positioned to intersect a first straight line extending orthogonally to the longitudinal axis of the flat drop optical fiber cable, wherein the one or more buffer tubes extend along entire length of the flat drop optical fiber cable, and wherein the one or more buffer tubes are formed of one of low smoke zero halogen or thermoplastic elastomer.

21. The flat drop optical fiber cable as claimed in claim 1, wherein the cable sheath further encapsulates one or more water blocking tapes.

* * * * *